April 20, 1965   T. M. KING   3,178,960
GEAR SHIFT ADAPTER
Filed March 21, 1962   2 Sheets-Sheet 1

INVENTOR.
THOMAS M. KING
BY Roy Griffith Jones
ATTORNEY

April 20, 1965 T. M. KING 3,178,960
GEAR SHIFT ADAPTER
Filed March 21, 1962 2 Sheets-Sheet 2
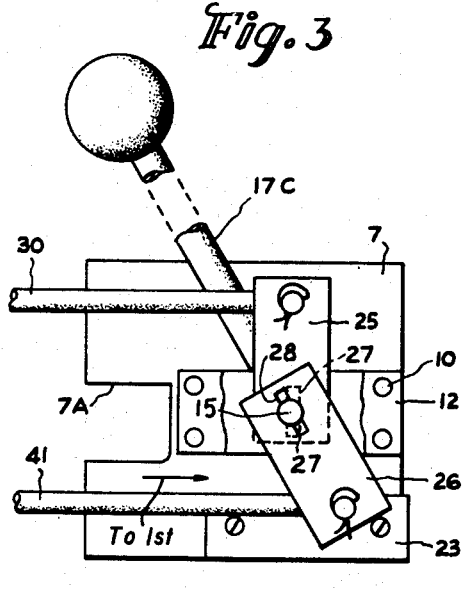
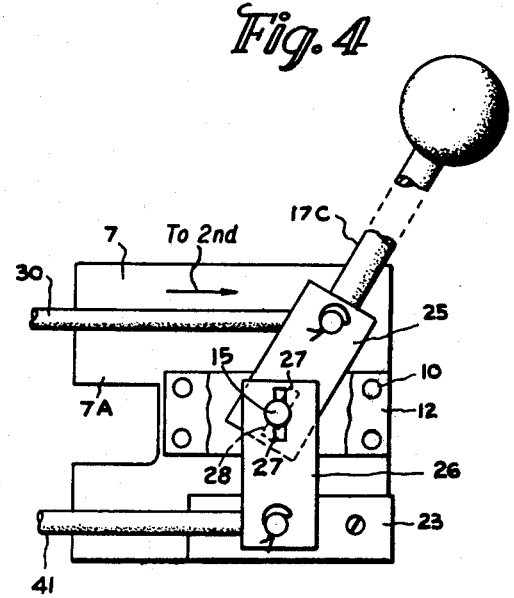
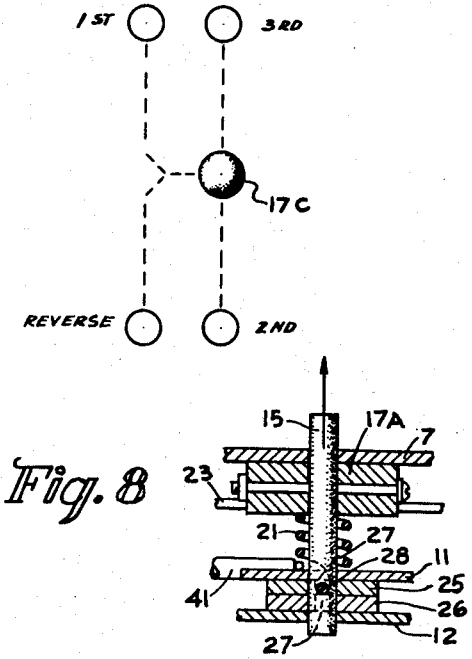
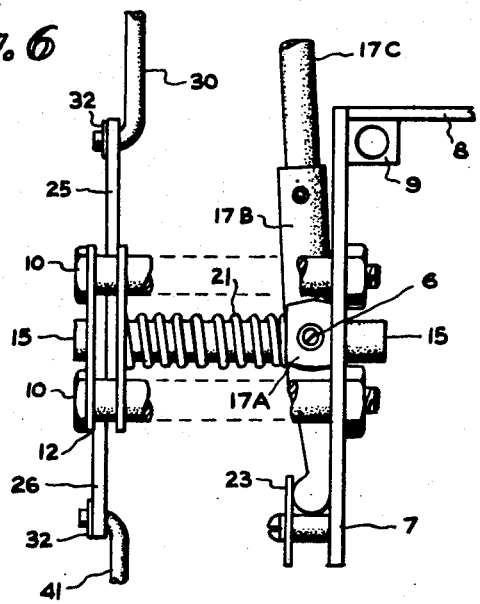
INVENTOR.
THOMAS M. KING
BY Roy Griffith Jones
ATTORNEY

United States Patent Office 3,178,960
Patented Apr. 20, 1965

3,178,960
GEAR SHIFT ADAPTER
Thomas M. King, Trenton, N.J., assignor to
The King Company, Trenton, N.J.
Filed Mar. 21, 1962, Ser. No. 181,427
2 Claims. (Cl. 74—473)

This invention relates to a gear shift adapter for automobiles and may be termed either a gear shift modifying means or a transmission adapter.

The invention herein disclosed was devised particularly for drag racing, wherein, especially due to the short distances raced, it is essential to save every instant of time in shifting gears from first to second speed. To attain the major purpose of the invention, several structural improvements have been made which increase efficiency, simplify certain components, diminish expense of construction, save repair time, readily render the car inoperative by unauthorized persons, etc., all of which will be pointed out below.

For drag racing, I have discovered that it is desirable to change the standard shift pattern, wherein the hand operated control or operating lever is moved forward in shifting from first to second speeds, to a pattern wherein the operating lever is moved backwardly for the mentioned speed shift. This my device can do without changing the arrangement of the gears, and the reason for the said change of shift pattern is as follows:

At the beginning of a drag race the cars are standing at the starting line with the gear shift handle in the first gear position. When the starting signal is given, the clutch is popped (suddenly engaged), the car leaps forward, and a terrific backward thrust is given to every movable thing in the car, especially the driver's body which is pressed back hard against the seat. With the standard shift pattern, the driver is obliged to push the shift handle forward, against this backward thrust and the natural movement of his body. With my transmission shift pattern, however, the backward thrust is used to move the shift lever backward from first to second, and the little effort required of the operator (slap of the hand) is in the same direction as the driver's body is being forced at this time. This gives a lightning fast shift with little effort from the driver.

Figure 1:
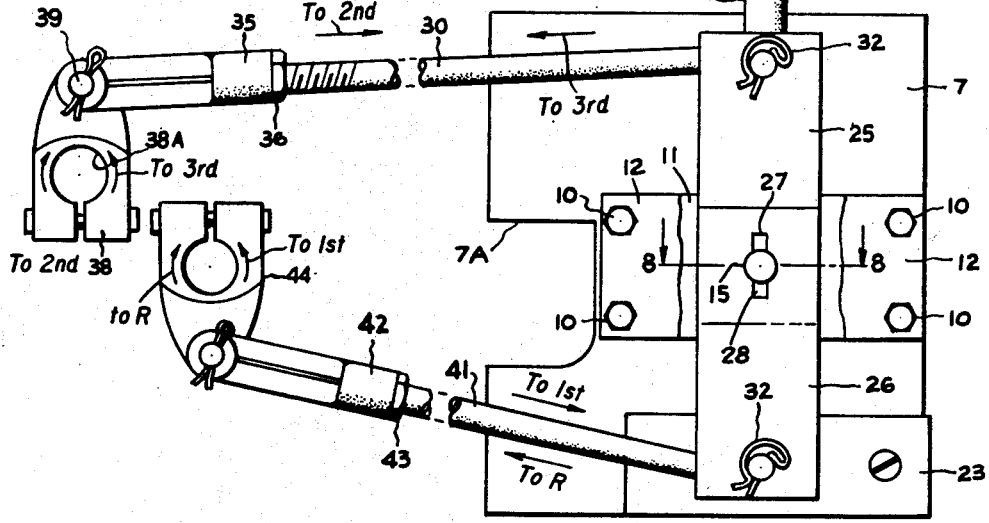
Figure 2:
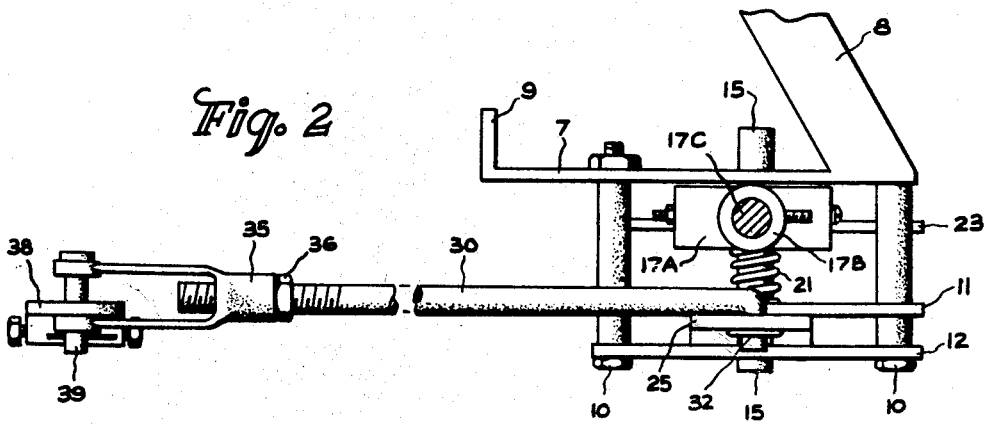
Figure 7:
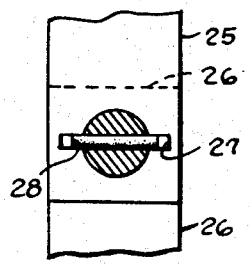

An embodiment of the invention is illustrated in the accompanying drawings, in which FIGURE 1 is an elevational view;
FIGURE 2 is a plan view of FIGURE 1;
FIGURE 3 is a fragmentary elevational view of FIGURE 1 but shows the control lever and adjacent mechanism in position of first speed, wherein the control lever is forward and in position to be pulled back for second speed.
FIGURE 4 is similar to FIGURE 3 but shows the control lever in pulled-back position for second speed;
FIGURE 5 is a diagram illustrating the shift pattern of this invention relative to the required movements of the control lever; and
FIGURE 6 is a fragmentary end view of FIGURE 1.
FIGS. 7 and 8 show the means for selectively connecting the rock shaft to either of two levers.

Referring to the drawings for a detailed description, the device comprises a plate 7 which is vertically positioned when attached to a transmission casing, the attachment being made by a brace 8 and lug 9 (FIGURE 2) which extend from one face of said plate and which may be bolted to the casing. Held to plate 7 by four bolts 10 is a pair of smaller and oblong plates 11 and 12. The latter are spaced from and are parallel to the plate 7 and are also spaced from and parallel to each other. An axially movable rock shaft 15 is journalled in the plates 7, 11 and 12 and is adapted to be both rocked and moved axially by control lever 17. The latter, which is of the stick type, is desirably made of two parts, of which the lower part 17A (FIGURE 2) is a casting directly fixed to the rock shaft and forms a socket into which the upper part of knobbed rod 17B is removably received. One advantage of making the control lever, as described, is that the driver, on leaving the car can render it inoperable simply by lifting the upper part out of its socket and then either carrying it or locking it up. Other advantages are stated below.

A somewhat compressed coiled spring 21 is provided on the rock shaft, its respective ends bearing against plate 11 and the member 17A of the control lever.

Said coil is further compressed when the control lever is inclined laterally in the shifting operation. The compressed coil spring together with the backward thrust supplied by the sudden forward motion of the car produces the lightning fast shift from first to second gear. During said lateral motion, the lower end of the control lever, which is below the rock shaft, is the fulcrum end, and it bears against the plate 7. The latter plate, together with a small oblong plate 23 (FIGURES 1, 2, and 3), forms a guide for the lower end of the control lever. Plate 23 is secured to and spaced from plate 7, thus providing a simply-made guide open at the bottom so that any foreign matter will not collect in it as in previously devised guides.

Between the mentioned plates 11 and 12, an upwardly extending flat plate 25, and a downwardly extending flat plate 26, are attached to the rock shaft 15 in a known manner so that lever 25 is moved by rocking motion of the control lever in its normal position, and lever 26 is moved by rocking movement of the control lever in its laterally inclined position.

As shown more clearly in FIG. 8, the levers 25 and 26 are flat and held in adjacent facing and movable relation between plates 11 and 12. In accordance with the selective locking means, shown more clearly in FIGS. 1 and 8, each of these levers has a central aperture near one end to receive the rock shaft 15 in axially slidable relation. These levers also have through slots 27 located to be in registry when the levers are in normal, aligned relation. The slots may be transverse of the levers, as shown in FIG. 7, or longitudinal, as shown in the other views; and they fit a pin 28, or other suitable key means projecting radially from both sides of the rock shaft 15. Thus, when the pin 28 is located in the slot 27 of either lever 25 or 26, and the hand operated control lever 17C is rocked, that lever is rotated, leaving the other one stationary. Plate 25 and its connections controls the second and third speeds, and plate 26 controls the first and reverse. By disposing the levers 25 and 26 oppositely, these may be made straight, instead of having to be bent, as was previously necessary, thus simplifying these components.

An upper link 30, which is straight between its connecting end portions, is pivotally connected to the upwardly extending lever 25 by being bent and extending therethrough, as shown in FIGURE 2, with a retaining antirattle spring clip 32 (FIGURE 1) through its end. The link is externally threaded at its outer end portion, to threadedly and adjustably engage an internally threaded end of a shackle or bifurcated member 35, with a lock nut 36 threaded on the link and bearing against the shackle. A downwardly positioned crank or clamp 38 is swingably mounted on the cross pin 39 of the shackle. The crank 38 has an aperture 38A to receive a shaft, which may lead to a shifting fork. Similar linkage is connected to the downwardly directed lever 26, as link 41, shackle 42, lock nut 43 and crank or clamp 44, the latter however being directed upwardly. The opposing positons of lavers 25 and 26, and the consequent upper and lower positons of links 30 and 41, produce the reverse shift pattern, and incidentally enable these links to be made straight, instead of being bent as in prior shifting mechanism, and also position said links so that they do not interfere with placing the speedometer cable through slot 7A of plat 7 into the transmission.

In FIG. 1 the direction toward the front end of the automobile or car (not shown) in which a conventional three-speed transmission (also not shown) is installed is indicated by the large straight arrow. As indicated by the small curved arrows, crank 44 is designed for attachment to the transmission shaft (not shown) which is rotated in a counterclockwise direction toward the front of the car to shift into first or low gear, and in a clockwise direction toward the rear of the car to shift into reverse gear. As also indicated by small curved arrows, crank 38 is designed for attachment to the transmission shaft (also not shown) which is rotated in a clockwise direction toward the rear of the car to shift into second gear and in a counterclockwise direction to shift into third or high gear.

With the arrangement of the levers 25 and 26, the links 30 and 41, the cranks 38 and 44, and the control lever 17C, together with the body portion 17A thereof, as illustrated, the transmission will be shifted from the neutral position, as shown in FIGS. 1 and 8, to the first gear position by simply pushing the hand control lever 17C to the left against the compression spring 21 to move the pin 28 into locking position in the slot 27 of flat lever 26 and then pushing the control lever toward the front of the car to its limit, as shown in FIG. 3. Assuming that during the preliminary operation described the transmission clutch has been held disengaged, with the engine running, and the driver with his hand on the knob of the hand operated control lever 17C, and his eyes on the tachometer, then at the signal for the start of a race, for example, the clutch is abruptly engaged, causing the car to plunge forward and, due to inertia, will violently thrust the driver against the back of the car seat. Since in the usual arrangement of elements for shifting the gears in a conventional transmission the shift to second gear is effected by pushing the control lever toward the front of the car a racing driver with that arrangement would not only lose valuable time, but also might endanger control of the car by taking his eyes off the road while attempting to guide the lever forward into second gear against the backward inertia developed by the sudden forward motion of the car.

However, in my improved gear shift adapter assembly the initial forward start of the car will, also due to inertia, tend to urge lever 17C rearwardly toward second gear position; and as soon as the desired first gear speed is reached the driver will lightly jerk or slap the control rearwardly of the car, and with the aid of inertia the lever will continue its rearward movement; then as the pin 28 comes into registry with the slot 27 in lever 25 it will automatically be drawn into that slot by compression spring 21, thereby causing link 30 to rotate crank 38 toward its second gear position without interruption until control lever 17C reaches its second gear shift position, as shown in FIG. 4. Since the pin 28 will remain in the slot 27 of lever 25 until forced into the slot 27 of lever 26 by axial movement of the rock shaft 15 again to the left the transmission can then be shifted from the second to the third or high gear by merely pushing control lever 17C forwardly of the car to its limit in that direction, as also shown in FIG. 3.

Other advantages of the present devices are as follows:

Clutch and transmission repairs are made quite frequently by "hot rodders." Other kits now on the market, because of non-detachable handles, must be removed from the transmission before the transmission is removed from the car. The present shift does not; all that is necessary is the removal of the handle. The straight handle can be pulled out easily without the use of any tools. The curved handle only requires the removal of a set screw; this can be accomplished from within the car. When the kit is being installed on a transmission which has been taken out of a car, all the adjustments can be made before the transmission is replaced in the car. After the adjustments are made, the handle is removed, the transmission placed in the car, and the handle is then replaced in its normal position. The permanently attached handle of all other kits makes it impossible to install a transmission with one of these other kits attached. When a new installation is being made of the present mechanism on a transmission which is in a car, the kit can be installed, with the shift handle removed, before the hole for the shift handle is cut in the floor. This enables the installer to locate the hole most accurately and easily. With the other kits, the location of the hole through the floor for the shift handle is largely guesswork and the installer usually winds up with a hole larger than necessary for the movement of the shift lever. With the present kit, the hole can be located much more accurately and held to approximately 2" x 3½". After the kit is installed and the front seat adjusted to the driver's liking, the handle can be bent or cut to meet the operator's desire. Most "hot rodders" like two handles, a short one for racing and a long one for normal driving. The present device is the only one that can supply this feature. Also the adaptability of the handle permits the avoidance of obstructions such as instruments, dash, etc.

From the foregoing description it will be seen that I have designed a gear shift adapted for a conventional three-speed automobile transmission in which the hand operated control lever 17C moves toward the rear of the car to shift the transmission into second gear, instead of forwardly as in the usual assembly of gear shift operating levers. This provides two extremely important advantages, particularly in racing, namely (1) by utilizing the inertia of the hand control lever 17C at the start of the race to help thrust it from first toward second gear position it provides the fastest possible shift from the first to the second gear position; and (2) it enables the driver to accomplish the shift to second gear without affecting his control of the car in that it enables him to keep his eyes on the tachometer and the road.

Although in my improved gear shift adapted I have utilized certain individual elements which are old in the art, I have combined such elements with others in a cooperative manner to provide an entirely new gear shift operating assembly having the following distinctive advantages over previous gear shift operating assemblies for three-speed racing car transmissions of which I am aware:

(1) The fast gear shift from first to second, as described, is rendered possible not only by the initial rearward thrust of the control lever 17C, due to its inertia at the start of the car, but also by the compression spring 21 which automatically draws the pin 28 from slot 27 of flat lever 26 into that of lever 25 as it passes the neutral position, thereby instantly rotating clamp 38 toward second gear position.

(2) The arrangement of the flat levers 25 and 26 as shown in FIG. 1, wherein they project vertically in aligned opposite directions when in their neutral position, as shown, is particularly advantageous in that the cranks 38 and 44 and the links 30 and 41 connecting them to the sides of the levers 25 and 26 are in vertically coplanar relation, thereby obviating the necessity of lateral or vertical bending of the links 30 or 41, or varying the lengths of the shafts of the transmission, to prevent operating interference of the assembled elements with one another, as would be necessary if both levers 25 and 26 extended downwardly.

(3) My improved gear shift adapter assembly shown and described is very simple and economical and can be easily and quickly attached to any automobile transmission having a standard three-speed gear shift to reverse the direction of movement of the hand operated control lever into second gear, as described. These advantages are extremely important to young men and boys comprising the majority of the customers for such a gear shift adapter.

An alternative arrangement to obtain the described shifting pattern consists in connecting the lever 25 to the rock shaft 15 so that it extends downwardly and also to turn the clamp 44 downwardly. Thereby both clamps 38 and 44 and also both levers 25 and 26 will be in a downward direction, the former relative to their respective links 30 and 41 and the latter relative to the rock shaft 15, the connections leading to the gears remaining the same. Such an arrangement however is inferior in certain respects to the first-described construction.

What is claimed is:

1. A gear shift adapter for attachment to a pair of automobile transmission shafts, one of which is rotatable counterclockwise toward the front of the automobile for shifting into first, or low gear, and in which the other shaft is rotated clockwise toward the rear of the automobile for shifting into second gear, said adapter including a crank for attachment to each of said shafts, a frame having means for attaching it to said transmission, a rock shaft rotatably and slidably mounted in said frame, a pair of flat levers pivotally mounted on said shaft in normally aligned vertical relation, means on said frame for holding said levers in adjacent facing and movable relation, said levers having normally registering through slots, and said shaft having radially projecting key means for selective locking insertion in either of said slots upon axial movement of said shaft, a hand operated control lever attached to said rock shaft in upwardly projecting relation, a compression spring on said shaft between said control lever and a portion of said frame urging said key means into the slot of the inner of the two flat levers, said control lever being axially movable in opposition to said spring to move said key means into the slot of the outer flat lever, and elongated link members connecting the free ends of said flat levers to respective free ends of said cranks for shifting the transmission into first gear when said control lever is moved forwardly of the automobile, and into second gear when the control lever is moved rearwardly of the automobile.

2. A gear shift adapted for attachment to a pair of automobile transmission shafts, one of which is rotatable counterclockwise toward the front of the automobile for shifting into first, or low, gear, and in which the other shaft is rotated clockwise toward the rear of the automobile for shifting into second gear, said adapter including a crank for attachment to each of said shafts, a frame having means for attaching it to said transmission, a rock shaft rotatably and slidably mounted in said frame, a pair of flat levers pivotally mounted on said shaft normally extending in vertically aligned, opposite directions, means on said frame for holding said levers in adjacent facing and movable relation, said levers having normally registering through slots, and said shaft having radially projecting key means for selective locking insertion in either of said slots upon axial movement of said shaft, a hand operated control lever attached to said rock shaft in upwardly projecting relation, a compression spring on said shaft between said control lever and a portion of said frame urging said key means into the slot of the inner of the two flat levers, said control lever being axially movable in opposition to said spring to move said key means into the slot of the outer flat lever, an elongated link member connecting the free end of the downwardly extending flat lever to the free end of the crank for shifting the transmission into first gear when the control lever is moved forwardly of the automobile, and a longer link member connecting the free end of the upwardly extending flat lever with the crank for shifting the transmission into second gear when the control lever is moved rearwardly of the automobile.

References Cited by the Examiner

UNITED STATES PATENTS

| | | | |
|---|---|---|---|
| 1,156,272 | 10/15 | Cass | 74—473 X |
| 2,143,918 | 1/39 | Kliesrath | 74—473 |
| 2,922,315 | 1/60 | Primeau | 74—473 |
| 2,961,890 | 11/60 | Marshall | 74—473 X |
| 3,018,670 | 1/62 | Lohn | 74—473 X |

DON A. WAITE, *Primary Examiner.*

BROUGHTON G. DURHAM, *Examiner.*